United States Patent [19]

Heichberger

[11] Patent Number: 4,977,745

[45] Date of Patent: Dec. 18, 1990

[54] METHOD FOR THE RECOVERY OF LOW PURITY CARBON DIOXIDE

[76] Inventor: Albert N. Heichberger, 1778 Monument Oaks Dr., Jacksonville, Fla. 32211

[21] Appl. No.: 325,766

[22] Filed: Mar. 20, 1989

Related U.S. Application Data

[63] Continuation-in-part of Ser. No. 52,723, May 20, 1987, abandoned, which is a continuation of Ser. No. 818,993, Jan. 13, 1986, Pat. No. 4,639,262, which is a continuation-in-part of Ser. No. 622,217, Jan. 19, 1984, abandoned, which is a continuation-in-part of Ser. No. 568,717, Jan. 6, 1984, Pat. No. 4,572,728, which is a continuation-in-part of Ser. No. 511,270, Jul. 6, 1983, Pat. No. 4,498,303.

[51] Int. Cl.$^5$ ............................................... E25J 1/00
[52] U.S. Cl. .................................... 62/10; 60/648; 62/12; 62/28; 62/35; 55/68
[58] Field of Search ................ 62/10, 12, 28, 30, 35, 62/50.3; 60/648; 55/68

[56] References Cited

U.S. PATENT DOCUMENTS

| | | | |
|---|---|---|---|
| 3,469,410 | 9/1969 | Schramm et al. | 62/28 |
| 3,983,711 | 10/1976 | Solomon | 62/30 |
| 3,984,993 | 10/1976 | Muska | 62/10 |
| 4,100,759 | 7/1978 | Tyree | 62/55 |
| 4,211,085 | 7/1980 | Tyree | 62/48 |
| 4,332,598 | 6/1982 | Antonas et al. | 62/28 |
| 4,417,449 | 11/1983 | Hegarty et al. | 62/28 |
| 4,566,278 | 4/1986 | Force | 60/648 |
| 4,609,388 | 9/1986 | Adler et al. | 62/12 |

Primary Examiner—Ronald C. Capossela

[57] ABSTRACT

A process for the economical recovery of carbon dioxide from a gas stream containing less than 85% carbon dioxide, by cooling the contaminating gas to remove water vapor, compressing the cooled gas to an elevated temperature and pressure, and drying the gas to a dewpoint of not more than about $-85°$ F.; condensing and removing the carbon dioxide from the dried compressed gas; and heating the remaining noncondensed gas mixture and expanding it to produce and recover kinetic energy and a cooled gas mixture.

17 Claims, 2 Drawing Sheets

METHOD FOR THE RECOVERY OF LOW PURITY CARBON DIOXIDE

CROSS-REFERENCE TO RELATED APPLICATIONS

This is a continuation-in-part of U.S. patent application Ser. No. 07/052,723, filed May 20, 1987 now abandoned which is a continuation of U.S. application Ser. No. 818,993 filed Jan. 13, 1986, now U.S. Pat. No. 4,639,262 which is a continuation-in-part of U.S. application Ser. No. 622,217, filed Jan. 19, 1984 abandoned, which is a continuation-in-part of U.S. application Ser. No. 568,717, filed Jan. 6, 1984 now U.S. Pat. No. 4,572,728, which is a continuation-in-part of U.S. application Ser. No. 511,270, filed July 6, 1983, now U.S. Pat. No. 4,498,303 which are incorporated herein by reference.

TECHNICAL FIELD

This invention relates generally to the recovery and liquefaction of carbon dioxide and relates more particularly to a process and application for liquefying a flow of relatively low purity carbon dioxide gas in conjunction with providing an economical commercially resalable food grade carbon dioxide product.

BACKGROUND OF THE INVENTION

The United States of America has a policy of utilizing the present national coal reserves of approximately 3.5 trillion tons of coal in the 820 power plants that will burn coal over the next 100 years. This will produce about 10.29 trillion tons of carbon dioxide to be vented to the atmosphere. The world is now being made aware of the "greenhouse effect" which predicts that the accumulation of carbon dioxide and other gases in the atmosphere will raise the global temperature by about 2° C. by 2050 and by about 5° C. by 2100. This is expected to be disastrous and accordingly, all nations are preparing immediately to reduce carbon dioxide emissions drastically. The United States Government has issued a report of a study of this problem "Can We Delay a Greenhouse Warning?" This study notes that control of $CO_2$ emissions from plants is an important step to take, and that the only technically feasible process is that of absorbing $CO_2$ in nonethanolamine (MEA process), but that process is too costly in that it seriously reduces the capacities of the plants so much that it would not be economically feasible. Applicant's process is intended to meet that problem head-on and provide an economically feasible process for removing $CO_2$ from stack gases or other gas streams low in $CO_2$ content, i.e., less than about 85% $CO_2$.

Another advantage of the present process is to provide carbon dioxide and nitrogen for use in programs of enhanced oil recovery (EOR). These programs are designed to go beyond the present art of primary and secondary methods of recovering petroleum from underground reservoirs. Only about 25–30% of the petroleum is recovered by the conventional primary and secondary methods. EOR programs increase that recovery to about 45–50% using carbon dioxide and nitrogen. Approximately 900–5400 cubic meters of $CO_2$ are required per cubic meter of petroleum recovered. The applicant's process will provide an economical source of $CO_2$ for such a process.

The process of this invention was developed specifically, over a period of about 6 years to recover carbon dioxide economically from gas streams which all other processes, e.g., MEA process, fail to do at all or fail to do in an economically feasible fashion. Preferred procedures in the process of this invention are accomplished by using any of three types of patented separators for the separation and liquefaction of carbon dioxide from the treated gas stream contaminated with carbon dioxide. The patented separators are described in U.S. Pat. Nos. 4,498,303; 4,572,728; or 4,639,262; and they describe gas-to-gas separation and gas-to-liquid separation. The step of separation is the key to an economically feasible process that does not rely on any expensive solution step such as in the MEA process. Other features of the present process are to utilize for heating or cooling any of the various gas and liquid streams in the process for heat exchange with other streams in the process. Furthermore, heat energy is converted to kinetic energy by expanding pressurized gas in turbines that may drive electric generators to produce electric power for use in the plant. The treated gas streams contain substantial amounts of nitrogen and oxygen and these gases are separated, purified and liquefied to produce valuable products that may be sold commercially and thereby reduce overall costs of removing carbon dioxide from flue gases and other gas streams vented to the atmosphere. There is no teaching in the prior art to expect that a process of this type would be successful in an economic sense. As a matter of fact, the consensus of the industry was that it would be impossible to accomplish. Hence, the MEA process was considered by the U.S. Government to be the only way to separate carbon dioxide from low purity streams, i.e., less than about 85% $CO_2$.

The present process also purifies the flue gas of oxides of sulfur and the oxides of nitrogen so that the purified gas stream that is vented to the atmosphere will meet more stringent specifications than the Government's Environmental Protection Agency standards. The contaminating flue gas stream will be purified of sulfur dioxide to less than 0.3 PPM, carbon monoxide less than 10 PPM, and oxides of nitrogen to less than 10 PPM by volume. These food grade carbon dioxide specifications are current industry standards. The purification of the contaminating gas of vaporous odors and particulates are not part of this invention and therefore, are not discussed for both simplicity and proprietary reasons.

Various present methods of liquefying high purity 90% or better carbon dioxide gas are well known. Typically, the liquefaction process of a relatively pure carbon dioxide comprises of compressing the gaseous carbon dioxide to a pressure of approximately 233.85 psig to 312.1 psig and then removing the latent heat of condensation with a secondary refrigerant at an evaporating temperature below the saturation temperature of the carbon dioxide pressure or −12° F. or −4° F. respectively. The theoretical range of pressures over which vaporous carbon dioxide can be condensed to a liquid is approximately 60.43 psig to 1057.4 psig.

Low purity carbon dioxide also contains contaminating gases with a lower temperature of condensation than carbon dioxide and these contaminating gases require a lower temperature refrigerant to condense than the carbon dioxide vapors. Therefore, the carbon dioxide may be separated from a contaminating gas source by fractional condensation. This invention specifically removes the carbon dioxide vapors from a gas stream between any compressor created saturation point down to the triple point of carbon dioxide. Any carbon dioxide below the triple point is unrecoverable.

This invention relates to a process for recovering carbon dioxide vapors from a gas stream such as flue gas, industrial waste gas streams or any other low purity carbon dioxide gas stream, particularly to a process for recovering carbon dioxide at purities of less than about 85% that are too low to recover economically by a conventional carbon dioxide liquefaction system. It specifically replaces the MEA chemical absorption process. This invention produces carbon dioxide liquid or vapor at a substantial utility cost reduction below all existing MEA technology.

It has proved to be most difficult and costly to recover, purify and liquefy the carbon dioxide vapors when they are present in low concentrations in a gas stream. Thus, all known processes which recover carbon dioxide vapors present in a gas at low concentrations involve high investment and/or production utility costs. In particular, in all MEA type absorption processes, the excessive amounts of steam required to regenerate the absorbent prohibits economic recovery of carbon dioxide from low purity gas sources, such as a steam boiler flue stack gases which are in the magnitude of 8 to 15% volume carbon dioxide purity.

There are basically three types of carbon dioxide vapor and gas stream recovery combinations: (1) 85-100% pure carbon dioxide vapor-laden streams, (2) less than 85% and greater than 50% carbon dioxide vapor-laden gas streams, (3) 50% and less carbon dioxide vapor-laden gas streams. In Item (2) above, we are removing the non-condensable gases from the condensable carbon dioxide vapors. In Item (3) above, we are removing the condensable carbon dioxide vapor from the non-condensable gases. The above is determined mathematically by the ratio of the carbon dioxide vapor pressure to the partial pressure of the non-condensable gas stream. When this ratio is greater than one, we are removing the non-condensable gas from the carbon dioxide vapor. When this ratio is equal to one or less, we are removing the carbon dioxide vapor from the non-condensable gas. When we are removing a non-condensable gas from a carbon dioxide vapor we reach the point in fractional condensation where this ratio becomes one and then the carbon dioxide vapor must be removed from the non-condensable gas.

The removal of carbon dioxide from the non-condensable gas can occur only when the carbon dioxide vapor pressure is above the carbon dioxide triple point of $-69.9°$ F. The removal of carbon dioxide vapor pressure below the triple point will cause freezing of the carbon dioxide. Therefore, the carbon dioxide vapors contained in the non-condensable gas who's dewpoint is below the triple point is non-recoverable vapors and are vented.

The invention has two types of non-condensable vent procedures; a continuous vent process and a batch vent process. The batch vent process is applicable for approximately 50% or greater carbon dioxide purity gas stream. It's primary advantage is that it minimizes the amount of non-recoverable carbon dioxide vapor vented. It operates on the basic principle that the higher the non-condensable gas pressure, the less carbon dioxide vapor at saturation conditions it will hold. The carbon dioxide vapor pressure maintained equilibrium conditions and any increase in carbon dioxide vapor pressure will condense to a liquid. The continuous vent process will vent all the carbon dioxide vapors in the non-condensable gas stream. Example: a 95% carbon dioxide vapor stream at $-12°$ F. will vent 5.3% of the carbon dioxide vapor on a continuous vent process. The same 95% carbon dioxide vapor stream will vent 1.0% of the carbon dioxide vapor on a batch vent process.

BRIEF SUMMARY OF THE INVENTION

This invention relates to a process for the recovery of carbon dioxide from a gaseous mixture containing water and less than about 85% carbon dioxide, the process which comprises:

a. cooling the gaseous mixture to remove substantially all water;

b. compressing the cooled gaseous mixture to an elevated temperature and pressure and drying the compressed gaseous mixture to a dewpoint of not higher than about $-85°$ F.;

c. cooling the compressed dried gas to liquefy said carbon dioxide therein and to separate the liquid carbon dioxide from the remaining noncondensed gas mixture; and d. heating the noncondensed gas mixture and expanding said gas to produce kinetic energy and a cooled gas mixture.

In one specifically preferred embodiment the invention includes the use of any available hot gas or liquid stream to heat the noncondensed gas mixture in step d. and the conversion of the heat energy in that hot noncondensed gas mixture into kinetic energy by expansion in a turbine. In another embodiment the gaseous mixture treated in step a. is a flue gas containing less than 50% carbon dioxide. In still another embodiment the compressed dried gas of step c is introduced into a mass of liquid carbon dioxide to cause condensation of the carbon dioxide in that compressed dried gas.

In one preferred embodiment the original gas mixture is cooled to condense and remove nearly all of the contaminating water vapor and at the same time to reduce the specific volume and density of the gas stream, thereby, reducing the horsepower requirements of compression. The gas stream is then compressed to an elevated pressure, so that the partial pressure of the carbon dioxide is equal to a saturation temperature of approximately $-12°$ F. or some other preferred saturation temperature.

All water vapor is removed from the contaminating gas stream at either an intermediate pressure or the discharge pressure of the gas compressor by desiccant drying to produce a water vapor dewpoint at pressure (DPP) of $-85°$ F. This low dewpoint eliminates the freezing of water vapor during the separation and liquefaction of the vaporous carbon dioxide. The frost and ice formation in the carbon dioxide liquefier/separator would cause reduced capacity and eventual blockage of the liquefier/ separator with the results of no liquid carbon dioxide output to the storage tank.

The compressed and dried low purity carbon dioxide gas then passes through a gas to gas regenerative type heat exchanger. It's primary function is to recover the mechanical refrigeration energy expended to cool the separated high pressure contaminating gases. The gas to gas cooler accomplishes this energy savings by cooling the compressed and dried low purity carbon dioxide gas stream while in count-current flow it warms the refrigerated or cooled contaminating gases.

The compressed and dried low purity carbon dioxide gas then enters the gas to liquid separator (U.S. Pat. No. 4,498,303), or the gas to gas separator (U.S. Pat. No.

4,572,728 or U.S. Pat. No. 4,639,262) for liquefaction and separation of the carbon dioxide vapors from the contaminating gases. The gas to liquid or gas to gas separator is basically a vertical carbon dioxide absorber tower. The compressed carbon dixoide vapors are absorbed in the absorbent liquid carbon dioxide and the non-condensable gases pass through the absorbent and are vented.

The cooled separated non-condensable gas, further, is used as the coolant to cool the low purity carbon dioxide gas stream prior to compression. This step of the process has a dual advantage in that it recovers the mechanical refrigeration energy required to cool the separated high pressure contaminating gasses and at the same time recovers waste heat energy from the low purity carbon dioxide gas stream for recovery in an expansion turbine as mechanical work.

The recovery of the compression horsepower energy and waste heat is accomplished by an expansion turbine and converted by a generator to electrical power for the various compressor motors. In an especially advantageous mode the expansion turbine consists of multiple stages of expansion. Each stage is pre-heated by alternate sources of heat recovery. It is another object of the expansion turbine to use the expanded low pressure contaminating gas stream as a refrigerant for use in the liquefier/separator inplace of a conventional mechanical refrigeration system or for other process coolant requirements, such as gas coolers, compressors intercoolers and aftercoolers or precoolers. In the especially advantageous mode, by balancing the work generated into electrical power by the expansion turbine versus the refrigeration gas produced by the expansion process, will allow the lowest overall kilowatt reduction in the production of the food grade carbon dioxide. This has the results of minimum utility costs per pound of carbon dioxide produced.

These and other objects, features and advantages of the present invention will become apparent after a review of the following detailed description of the disclosed embodiment and the appended drawings and claims.

DESCRIPTION OF THE PREFERRED EMBODIMENTS

Figure 1:
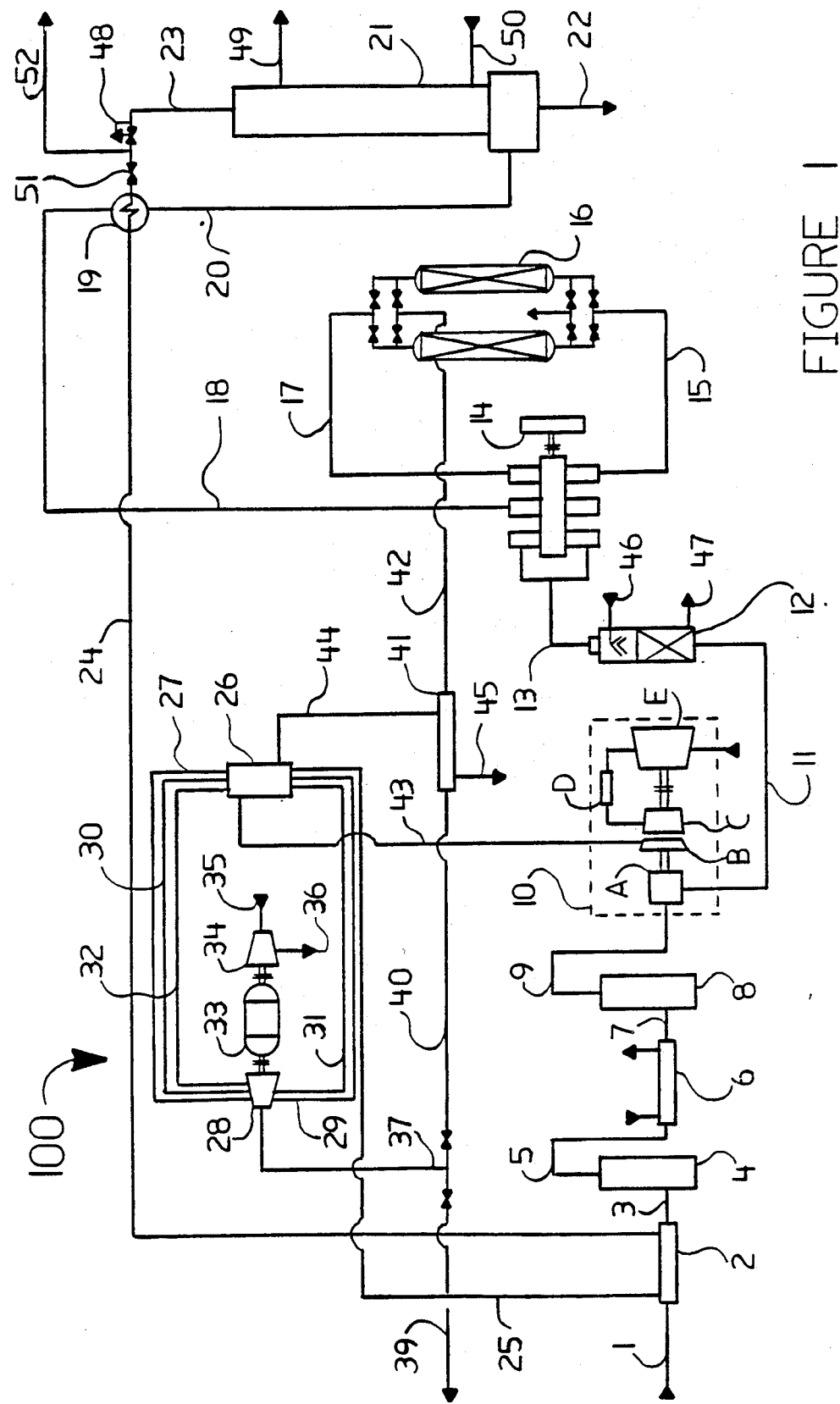
FIG. 1 is a single line flow schematic view of a disclosed embodiment of the low purity carbon dioxide recovery system of the present invention. It depicts the preferred mode of the embodiment of the expansion work process.

In the drawing there is shown a preferred embodiment 100 of the invention wherein a flow of relatively low purity carbon dioxide gas is purified, compressed, dried, separated and liquefied in conjunction with providing pure food grade liquid or gaseous carbon dioxide or an industrial grade liquid or gaseous carbon dioxide. The typical source of low purity carbon dioxide gas is from an industrial high sulfur 3 to 4% coal fired electrical power generation plant and commonly called flue gas. This flue gas contains relatively large amounts of contaminating gases such as nitrogen, water vapor, sulfur dioxide and oxygen. The major contaminate nitrogen has a substantially lower condensation temperature than that of carbon dioxide. The embodiment 100 will typically be used to advantage in a flue gas separation (FGS) plant for the commercial production of foodgrade liquid carbon dioxide and or nitrogen.

The impure and lean carbon dioxide gas stream will be flue gas from the combustion of a fossil fuel. The flue gas is removed downstream of the electrostatic precipitator relatively free of solid particulates (fly ash, coal dust and mineral matter) and at a temperature of at least 350° F. and perhaps as high as 1200° F. or more. The sulfur content of the fuel has been reduced from 3.7% to less than 0.3PPM by volume of sulfur dioxide. The constituents of the cooled flue gas at 60° F. and 14.7 psia or at the inlet to the flue gas compressor is approximately nitrogen, 77%, carbon dioxide 14%, oxygen 4%, sulfur about 0.3PPM, and the remainder water vapor.

The flue gas is conducted via conduit 1 to the inlet of the flue gas cooler, heat exchanger, 2 the heat exchanger is either a conventional shell and tube or the finned coil type. The coolant in the shell is refrigerated nitrogen gas from the carbon dioxide separation process. The cooled flue gas and any condensed water is carried by conduit, 3 to water separator (knock-out drum) Item 4. All condensed water vapor is separated from the flue gas stream and the condensed water is sent to drain by a water trap or water-leg seal. The flue gas with a reduced water dewpoint is conducted by conduit 5 to the second stage flue gas cooler, heat exchanger Item 6. The flue gas cooler is either a conventional shell and tube or finned coil type. The coolant in the shell is evaporated ammonia from the mechanical refrigeration system. The cooled flue gas and any condensed water is carried by conduit 7 to water separator (knock-out drum) 8. All condensed water vapor is separated from the flue gas stream and the water is sent to drain by a water trap or water-leg seal.

The flue gas with reduced water dewpoint is conducted by conduit 9 to the inlet of the gas turbine flue gas compressor set, 10. The gas turbine flue gas compressor set consists of the following items:

10A - Flue Gas Compressor-Centrifugal Type,
10B - Power Turbine,
10C - Air Turbine,
10D - Fuel Combustor, and
10E - Air Compressor The centrifugal flue gas compressor using a gas turbine driver serves as the first stage or first two stages of gas compression. The flue gas is discharged at an elevated pressure and cooled by a conventional aftercooler (not shown) to 95° F.

This compressed and cooled gas is conducted via conduit 11 to the inlet of a direct contact flue gas cooler or water wash 12. This is a packed bed counter current flow vertical scrubber. The once-thru water coolant flow rate 46 is adjusted for 1 to 2° F. temperature rise of the effluent discharge water to drain 47.

The cooled and washed gas is conducted from the top outlet of the water wash 12 via conduit 13 to the inlet of the mulitple stage positive displacement flue gas compressor with electric motor driver, 14. All intercoolers and aftercoolers for simplicity are not shown. At an intermediate stage of gas compression of approximately 300 psig and 95° F. the flue gas is conducted via conduit 15 to a dessiccant type dryer 16 where all the water vapor is removed to a $-85°$ F. dewpoint at pressure (DPP). The dryed flue gas is then conducted via conduit 17 to the next stage of compression. The compressed flue gas is at an elevated pressure of 1200 to 2,000 psia and is discharged from the flue gas compressor at approximately 95° F. downstream of the aftercooler. A trap dryer of a molecular sieve or a dessicant may be installed at the condensing pressure to guarantee a low dewpoint of the gas stream.

This cooled and compressed gas is conducted via conduit 18 to and thru the gas to gas regenerative type precooler, 19. All sensible heat is removed from the flue gas stream and a small amount of latent heat of condensation of the vaporous carbon dioxide may occur. The coolant for the gas to gas precooler, 19, is refrigerated nitrogen gas from the carbon dioxide separation process in 21.

The cooled flue gas is conducted by conduit 20 into the inlet of liquid carbon dioxide separator 21 (as explained in U.S. Pat. No. 4,498,303, dated Feb. 12, 1985). This is a fractional condensation liquefier/separator which liquefies the vaporous carbon dioxide and separates the non-condensable flue gases (N2, 02, etc.). The liquefier is basically a vertical carbon dioxide absorber tower. The compressed carbon dioxide vapors are absorbed in the liquid carbon dioxide (the absorbent) and the non-condensable gases pass through the absorbent and are vented via conduit 23. The liquid carbon dioxide is conducted by conduit 22 to a carbon dioxide liquid storage tank for use. The secondary refrigerant enters the liquefier/separator, 21, by conduit 50 and exits the liquefier/separator, 21, by conduit 49. This refrigerant may be supplied by either a conventional mechanical refrigeration system (two stage), cascade system, Joule-Thomson Valve or expander. Flow control valve 48 maintains a back pressure on the carbon dioxide liquefier/ separator 21, so that the carbon dioxide condensing pressure is 75.1 psia at all times.

The vented nitrogen gas is then conducted from valve 48 via conduit 51 to the gas-to-gas regenerative heat exchanger 19, and is heated from −69° F. to +94° F. The heat source is compressed dry flue gas which is being cooled down in temperature and then heated. Nitrogen vent gas is conducted by conduit 24 to the inlet of the flue gas cooler 2, where the gas is heated to within 6° F. of the flue gas temperature.

The heated nitrogen vent gas is then conducted via conduit 25, to the heat recovery heat exchanger 26, where the nitrogen vent gas is further heated. Heat is applied to the heat recovery heat exchanger via conduit 43 which conducts the exhaust gas at a temperature of at least 850° F., e.g., 850°-1200° F. from the gas turbine engine. The heated nitrogen vent gas is then conducted by conduit 27 to the inlet of the first stage of expansion in the turbo-expander 28. The gas is then expanded down to the first stage discharge pressure. The work produced by the expansion process drives the electrical generator 33 and produces electricity to drive all electric motors on the multi-stage flue gas compressor and mechanical refrigeration compressor. The cooled and reduced pressure nitrogen vent gas is then conducted by conduit 29 to the heat recovery heat exchanger 26, where the nitrogen vent gas is once more heated. Additional stages of expansion and heat recovery are dependent on the waste heat available and the gas pressure available. The work produced by the expansion process drives the electrical generator 33, and produces electricity.

The cooled and low pressure nitrogen vent gas is then conducted by conduit 37 to the conduit 39 and returned to the chimney and a slip stream is separated by valves from the main gas stream. This slip stream is conducted by conduit 40 to the preheaters 41, which heat the dryer purge gas. The heated dryer purge gas is conducted by conduit 42 to the desiccant dryer where it is used to reactivate the dryers desiccant beds. The heat source conducted by conduit 44 for the dryer purge gas preheater is the gas turbine engines exhaust gas from the discharge of the heated recovery heat exchanger 26.

The amount of heat recovery is dependent upon the total heat available from the flue gas stream which is recovered in the 1st stage flue gas cooler, and from heat available from other sources such as high temperature combustion gas, flue stack gas, and other waste heat streams. This will determine the number of turbo expander 28 stages.

Further heat recovery is accomplished in a steam turbine 34. Any onsite waste steam available is conducted via conduit 35 to the inlet of steam turbine 34, which converts the steam heat energy into mechanical energy which drives the generator 33 and produces electricity and reduces the electrical KW costs for carbon dioxide production. The back pressure steam and condensate is conducted via conduit 36 for inplant process application or returned to the boiler as condensate.

It is further part of this invention that both liquid carbon dioxide and liquid nitrogen may be produced simultaneously from the flue gas stream for commercial resale or use. The flow schematic would remain the same as the preferred mode of the embodiment as depicted in FIG. 1 with following process modifications.

The vented non-condensables nitrogen gas in conduit 23 in the outlet of separator 21, a gas-to-liquid carbon dioxide separator, passes through flow control valve 48, which functions as a back pressure regulator. The vented nitrogen is conducted in conduit 51 where through separating valves a slip stream of nitrogen for recovery and liquefaction from a range of 1% to 100% is conducted into conduit 52. Conduit 52 conducts the nitrogen slip stream into a typical nitrogen purification system to reclaim and remove the by-product waste $CO_2$. This $CO_2$ must be removed prior to liquefaction of the nitrogen or it will cause freezing of heat exchangers and orifices. A conventional MEA or other chemical solvent process will be used. Conduit 52 conducts the nitrogen slip stream into a conventional nitrogen refrigeration system, a conventional liquid nitrogen generator or a typical Joule-Thomson Refrigerator. These three conventional nitrogen systems are depicted and explained in detail in the 1968 ASHRAE, Guide And Data Book, entitled "Application in Chapter 49, Page 576, FIG. 3, Typical Joule-Thomson Refrigerator, Page 585, FIG. 19, Nitrogen Refrigeration System and Page 585, FIG. 20, Simplified Flow Diagram of Liquid Oxygen Generator.

It is a further part of the invention that in place of 21 of the preferred embodiment of FIG. 1, there may be used a gas-to-liquid carbon dioxide separator/liquefier (U.S. Pat. No. 4,498,303 dated Feb. 12, 1985), a conventional horizontal or vertical carbon dioxide liquefier, having a shell-and-tube type heat exchanger, or a conventional liquid-to-gas separator.

Figure 2:
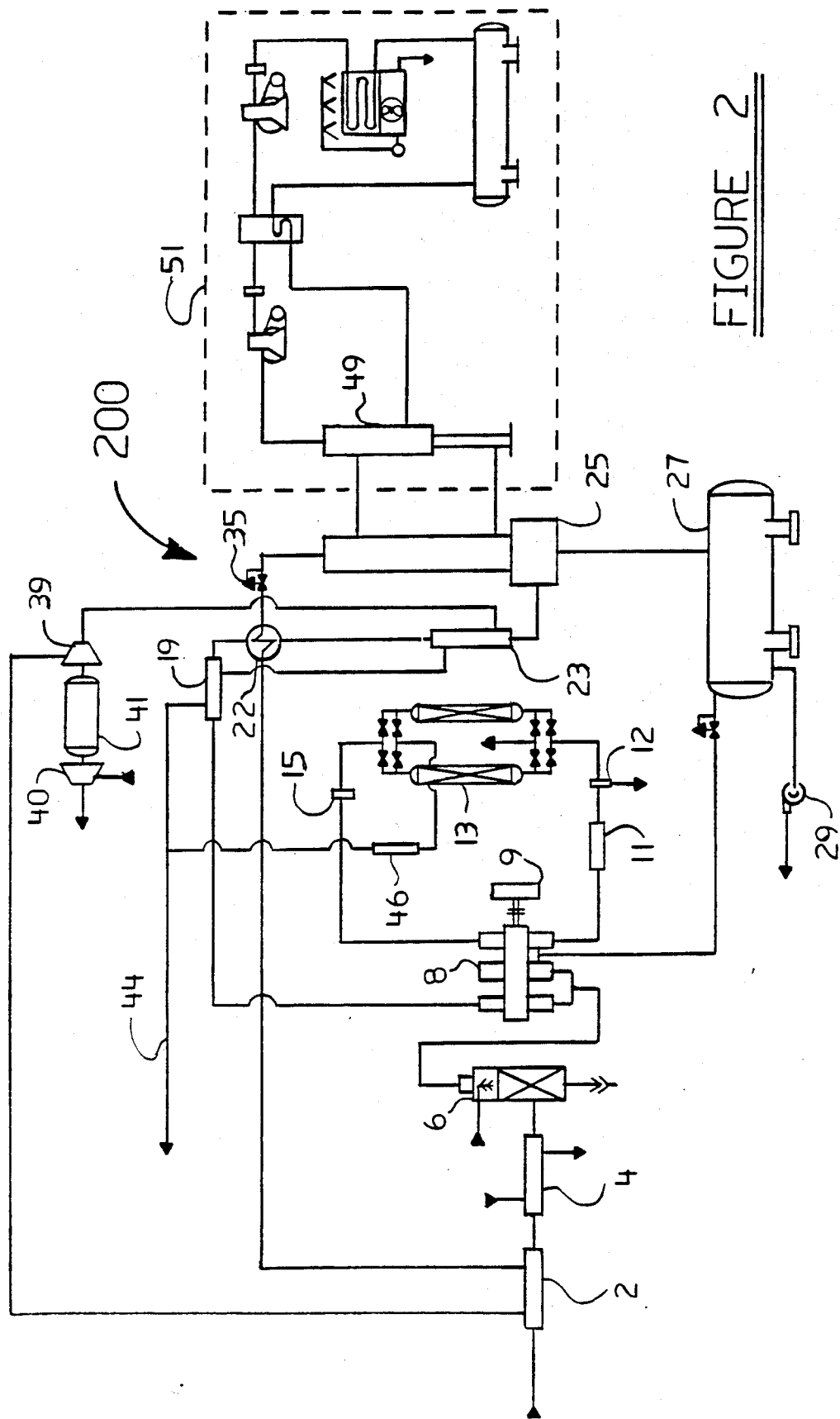
FIG. 2 is a single line flow schematic view of a disclosed embodiment of the low purity carbon dioxide recovery system of the present invention. It depicts an advantageous mode of the embodiment of the combination expansion work and refrigeration process.

Further, it is part of this invention that the preferred mode of the embodiment of the combination expansion work and refrigeration process as depicted in FIG. 2 may be used to produce economical food grade carbon dioxide for commercial resale. The fundamental difference of the design is that the centrifugal flue gas compressor is not needed with a gas turbine driver 10 (FIG. 1), and the reheat cycle for the multiple stage turbine expander 28, in conjunction is not needed with the heat recovery heat exchanger 26.

In the preferred mode of operation as depicted in FIG. 2, the discharge temperature of the nitrogen noncondensable vent gas at the outlet of the turbine expander will be approximately $-130°$ F. This cooled nitrogen gas can be used as a refrigerant precooler 23 and in after cooler 19 (FIG. 2). The effluent-warmed nitrogen gas stream will be returned to the chimney at approximately $+224.6°$ F. via conduit 44.

It is also part of this invention that any combination of the preferred mode of the embodiment of the expansion work process as depicted in FIG. 1 and the advantageous mode of the embodiment of the combination expansion work and refrigeration process as depicted in FIG. 2 may be used in conjunction for the most efficient energy system for the specific Carbon Dioxide Recovery Plant installation. Typically, this would permit heat recovery from the flue gas chimney, boiler or other waste heat sources to be used, so that, all intermediate stages of the multiple stage turbo expander may be heated to 600° to 650° F. or other temperature in lieu of using the gas turbine engine exhaust gas. Further, a conventional electric motor driver may be used on the flue gas centrifugal compressor 10A of FIG. 1, in pace of the depicted gas turbine driver.

It is also part of this invention that a conventional gas membrane separator may be used for the first and/or second stages of bulk gas separation. The membrane separator would be used to enrich the carbon dioxide volume percentage in the flue gas stream initially at about 8 to 20% to approximately 60 to 80% carbon dioxide by volume or greater using multiple stages of membrane separators. The membrane separator would be installed after compression of the flue gases to an intermediate pressure of 250 to 600 psig.

Although the present invention has been described in conjunction with the preferred embodiments, it is to be understood that modifications and variations may be utilized without departing from the principles and scope of the invention as defined by the following claims.

What is claimed is:

1. A process for the recovery of carbon dioxide from a gaseous mixture containing water, noncondensible gas, and less than about 85% carbon dioxide, the process which comprises:
   a. cooling the gaseous mixture to remove nearly all of the water;
   b. compressing the cooled gaseous mixture to an elevated temperature and pressure and drying the compressed gaseous mixture to a dewpoint of not higher than about $-85°$ F.;
   c. cooling the compressed dried gas to liquefy said carbon dioxide therein and to separate the liquid carbon dioxide from the noncondensed gas; and
   d. heating said noncondensed gas and expanding said noncondensed gas to produce kinetic energy and cooled noncondensed gas, and utilizing said kinetic energy elsewhere.

2. The process of claim 1 wherein said noncondensed gas mixture is at a temperature of about $-69°$ F. and is employed to cool said gaseous mixture in step b. after being compressed to said elevated temperature.

3. The process of claim 2 wherein said noncondensed gas mixture is subsequently subjected to heat exchange with said gaseous mixture to provide at least a portion of the cooling of step a., and thereafter is heated by heat exchange with the exhaust gas from a turbine-engine driving a compressor to provide the compressing of step b., and then is expanded in a turbo-expander to produce kinetic energy.

4. The process of claim 1 wherein said noncondensed gas mixture is employed to provide at least a portion of said cooling in step a.

5. The process of claim 1 wherein step d. is accomplished by heating said noncondensed gas mixture to an elevated temperature by heat exchange with any hot gas stream in said process or in a waste heat stream available for such heating, and introducing the heated gas mixture into a turbo-expander to produce the kinetic energy to operate an electric generator from which electricity is drawn off for use elsewhere.

6. The process of claim 5 wherein said hot gas stream is the hot exhaust gas at a temperature of at least about 850° F. from a turbine engine driving a compressor to provide said compressing of step b.

7. The process of claim 6 wherein said noncondensed gas mixture is subjected to a plurality of cycles of heating by heat exchange with said exhaust gas or other heat sources followed by expansion in said turbo-expander.

8. The process of claim 1 wherein step d. is accomplished by passing said noncondensed gas mixture through a turbo-expander to result in a low temperature gas mixture which is then employed to accomplish at least a portion of the cooling of step c.

9. The process of claim 8 wherein said gas mixture exiting from said turbo-expander is at a temperature of about $-130°$ F.

10. The process of claim 1 wherein said gaseous mixture is a flue gas at a temperature of at least about 350° F. containing carbon dioxide, nitrogen, oxygen, and water.

11. The process of claim 1 wherein step c. is accomplished by introducing said compressed dried gas into a mass of liquid carbon dioxide wherein the carbon dioxide in said compressed dried gas is condensed and the remainder of said compressed dried gas passes through said mass and is recovered as said noncondensed gas.

12. The process of claim 1 wherein step c is accomplished by introducing said compressed dried gas into a mass of liquid carbon dioxide wherein the carbon dioxide in said compressed dried gas is condensed to a liquid and becomes part of said mass, and the remainder of said compressed dried gas passes through said mass and is recovered as said noncondensed gas, said mass being maintained in the liquid phase by a refrigerant passing in indirect heat exchange relationship with said mass of liquid carbon dioxide.

13. The process of claim 12 wherein said refrigerant is a portion of the liquid carbon dioxide in said mass, said portion being vaporized in its use as said refrigerant and recovered as gaseous carbon dioxide.

14. The process of claim 1 wherein step c is accomplished by introducing said compressed dried gas into indirect heat exchange relationship with a refrigerant causing the carbon dioxide in said compressed dried gas to condense and the remainder of said compressed dried gas to continue on through said process as said noncondensed gas.

15. The process of claim 14 wherein the liquid carbon dioxide exiting from said indirect heat exchange relationship is returned, at least in part to said heat exchange relationship as said refrigerant and is thereby vaporized and recovered as gaseous carbon dioxide.

16. A process for the recovery of carbon dioxide from a glue gas containing less than 50% carbon dioxide content, which comprises:
  a. cooling said flue gas and removing substantially all of the water therefrom;
  b. compressing the resulting dewatered gas in stages with cooling between compression stages, said compressing being accomplished by a compressor driven by a turbine engine from which hot exhaust gases emanate;
  c. cooling said compressed gas by introducing it into a mass of liquid carbon dioxide to cause condensation of the carbon dioxide in said compressed gas and to allow the remainder of said compressed gas to pass through said liquid carbon dioxide and be collected as noncondensed gas at a temperature of about $-60°$ F.;
  d. passing said noncondensed gas in heat exchange relationship with said compressed gas of step c. to accomplish said cooling;
  e. passing said noncondensed gas resulting from step d. in heat exchange relationship with said flue gas to accomplish at least a portion of said cooling in step a.;
  f. passing said noncondensed gas resulting from step e. in heat exchange relationship with said hot exhaust gases of step b.; and
  g. expanding said noncondensed gas resulting from step f. through a turbo-expander to produce kinetic energy for use in driving an electric generator.

17. A process for the recovery of carbon dioxide from a flue gas containing less than 50% carbon dioxide content which comprises:
  a. cooling said flue gas and removing substantially all of the water therefrom;
  b. compressing the resulting dewatered gas in stages with cooling between compression stages;
  c. cooling the resulting compressed dewatered flue gas and introducing it into a mass of liquid carbon dioxide to cause condensation of the carbon dioxide in said compressed gas and to allow the remainder of said compressed gas to pass through said liquid carbon dioxide and be collected as noncondensed gas at a temperature of about $-69°$ F.;
  d. passing said noncondensed gas in heat exchange relationship with said compressed gas of step c. to accomplish said cooling;
  e. passing said noncondensed gas resulting from step d. in heat exchange relationship with said flue gas to accomplish at least a portion of said cooling in step a.;
  f. passing said noncondensed gas resulting from step e. through a turbo-expander to produce a cooled expanded noncondensed gas;
  g. passing said cooled expanded noncondensed gas in heat exchange relationship with said compressed gas from step b., and returning the resulting noncondensed gas to the source of said flue gas introduced into step a.

* * * * *